United States Patent [19]
Futatsugi et al.

[11] Patent Number: 5,664,129
[45] Date of Patent: Sep. 2, 1997

[54] VISUAL PROGRAMMING METHOD

[75] Inventors: Seiji Futatsugi; Masahiro Tachibana, both of Kawasaki; Takayuki Nakano, Yokohama; Shoichi Kubo, Tokyo, all of Japan

[73] Assignees: Hitachi, Ltd.; Hitachi ULSI Engineering Corporation, both of Tokyo, Japan

[21] Appl. No.: 510,476

[22] Filed: Aug. 2, 1995

[30] Foreign Application Priority Data

Aug. 10, 1994 [JP] Japan .................... 6-188087

[51] Int. Cl.$^6$ ............................................. G06F 15/00
[52] U.S. Cl. .......................... 345/339; 345/352; 345/967
[58] Field of Search .......................... 395/961, 965, 395/966, 967, 333, 334, 335, 339, 340, 348, 349, 352

[56] References Cited

U.S. PATENT DOCUMENTS 5,325,533  6/1994  McInerney et al. .
5,485,600  1/1996  Joseph et al. .
5,574,483  11/1996  Gerlach, Jr. .

OTHER PUBLICATIONS

Cox, P.T., et al. "Using a Pictorial Representation to Combine Dataflow and Object–Orientation in a Language Independent Programming Mechanism", reprinted from Proceedings International Computer Science Conference, 1988, pp. 695–704 (pp. 313–322). (English).

Primary Examiner—Mark R. Powell
Assistant Examiner—Ba Huynh
Attorney, Agent, or Firm—Fay, Sharpe, Beall, Fagan, Minnich & McKee

[57] ABSTRACT

A program described by using a graphic representation is edited and a text language type programming language is generated from the edited graphic representation. A data table for managing data to be used in programming, a process management table for managing processes applicable to the data and a program table for storing step information of the program are prepared. By using those data, the data and the processes applicable to the data are displayed and a user selects from those displays to graphically represent the program and store the step information of the program in the program table. The delivery of the data during the process is represented by the designation of the data sharing by ports accompanied with the graphic representation. Finally, the target program is generated from the program table.

7 Claims, 16 Drawing Sheets

| # | DIVISION | ADDRESS | TELNO |
|---|---|---|---|
| 1 | HOME ELECTRIC APPLIANCE | CHIYODA-KU, TOKYO | 03 (3000) 1111 |
| 2 | SOFTWARE | YOKOHAMA-SHI, KANAGAWA PREF. | 045 (111) 2222 |
| 3 | SYSTEM | KAWASAKI-SHI, KANAGAWA PREF. | 044 (222) 3333 |

FIG. 5

| DATA ID | DATA TYPE | DATA NAME |
|---|---|---|
| D01 | LABEL | labelPart |
| D02 | LIST | listPart |
| D03 | LABEL | labelPart2 |
| D04 | TEXT | infoPart |
| D05 | DB | enterpriseDB |

FIG. 6

| PROCESS | DATA TYPE | PROCESS NAME | ARGUMENT TYPE 1 | ARGUMENT TYPE 2 | RETURN VALUE TYPE |
|---|---|---|---|---|---|
| S01 | List | GetSelectedString | String | — | Boolean |
| S02 | Text | PutString | String | — | Boolean |
| S03 | DB | Search | String | String | String |
| S04 | String | Equal | String | — | Boolean |

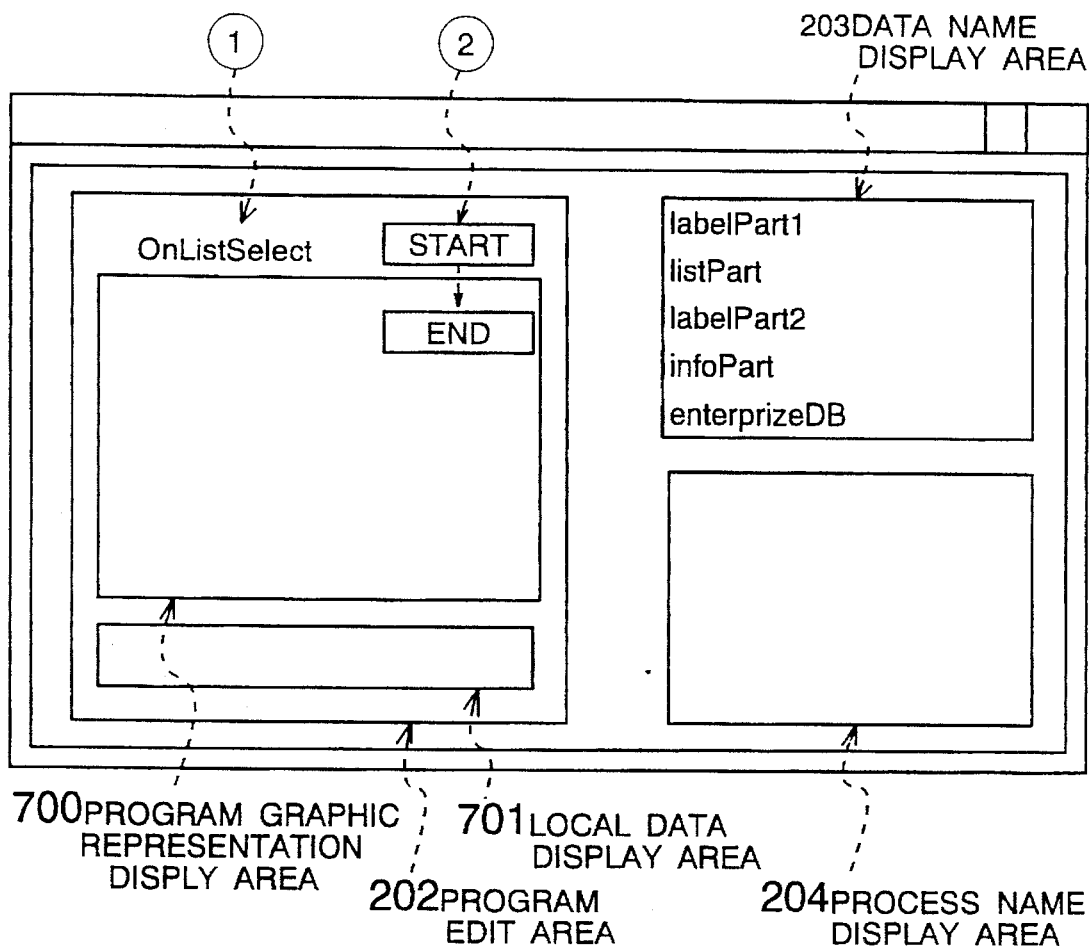

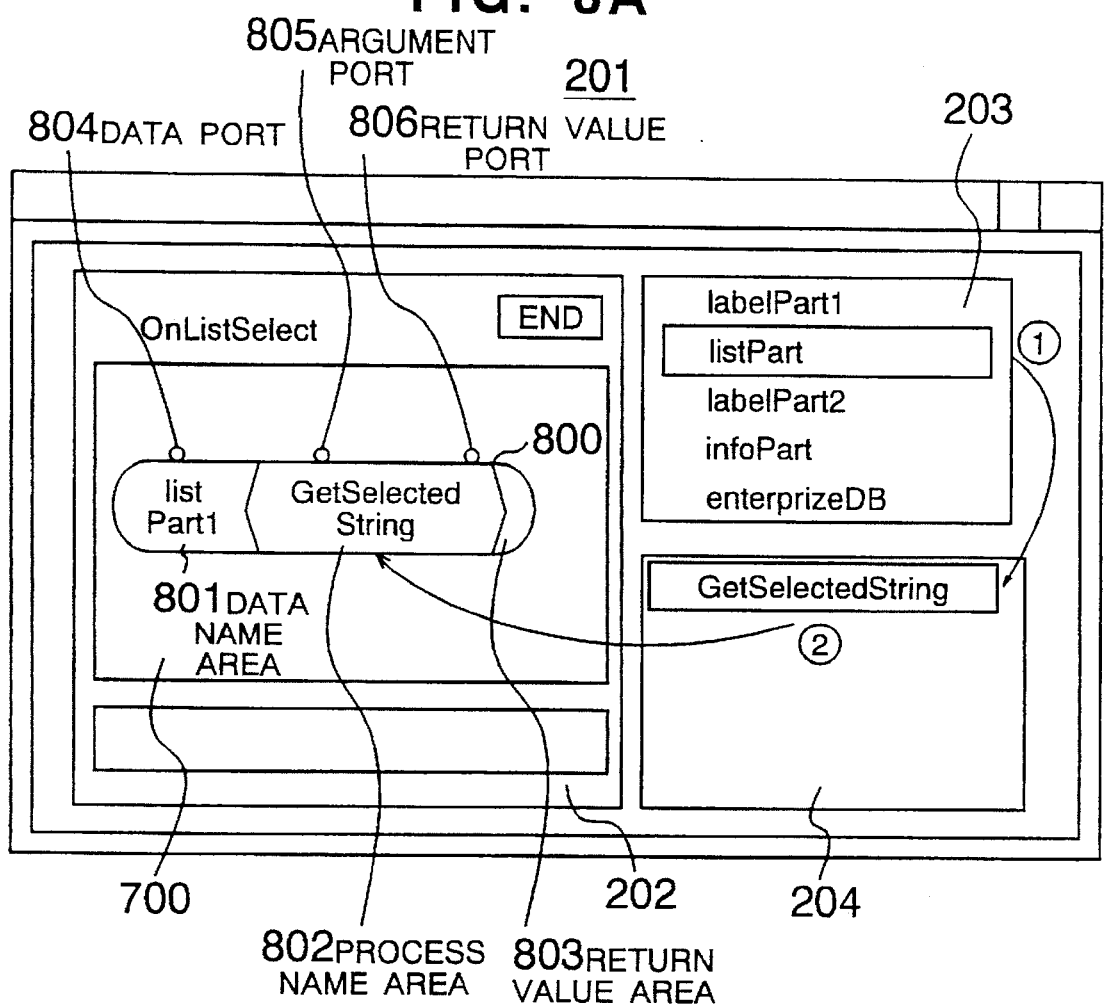

| # | DATA ID | PROCESS ID | ARGUMENT 1 | ARGUMENT 2 | RETURN VALUE |
|---|---------|------------|------------|------------|--------------|
| 1 | D02 | S01 | D06 | — | D07 |
| 2 | D05 | S03 | D08 | D09 | D10 |
| | | | | | |

| # | DATA ID | PROCESS ID | ARGUMENT 1 | ARGUMENT 2 | RETURN VALUE |
|---|---------|------------|------------|------------|--------------|
| 1 | D02 | S01 | D06 | — | D07 |
| 2 | D05 | S03 | D06 | D09 | D10 |
|   |     |     |     |     |     |

| # | DATA ID | PROCESS ID | ARGUMENT 1 | ARGUMENT 2 | RETURN VALUE |
|---|---------|------------|------------|------------|--------------|
| 1 | D02 | S01 | D06 | — | D07 |
| 2 | D05 | S03 | D06 | "Address" | D10 |
|   |     |     |     |           |     |

| # | DATA ID | PROCESS ID | ARGUMENT 1 | ARGUMENT 2 | RETURN VALUE |
|---|---------|------------|------------|------------|--------------|
| 1 | D02 | S01 | D06 | — | D07 |
| 2 | D05 | S03 | D06 | "ADDRESS" | D10 |
| 3 | D04 | S04 | D10 | — | D11 |
|   |     |     |     |     |     |

FIG. 13

(1) GENERATE FUNCTION TEMPLATE

```
OnListSelect( )
{
}
```
1300

(2) ADD VARIABLE DECLARATION

```
OnListSelect( )
{
    String06,D11 ;
    Boolean D07,D10 ;
}
```
1301

(3) ADD CODE MAIN PORTION

```
OnListSelect( )
{
    StringD06,D11 ;
    Boolean D07,D10 ;
        D07=liatPart->GetSelectedString (D06) ;
        D10=enterprizeDB->Search (D06," Address" 9 ;
        D11=infoPart->PutString (D10) ;
}
```
1302
1303

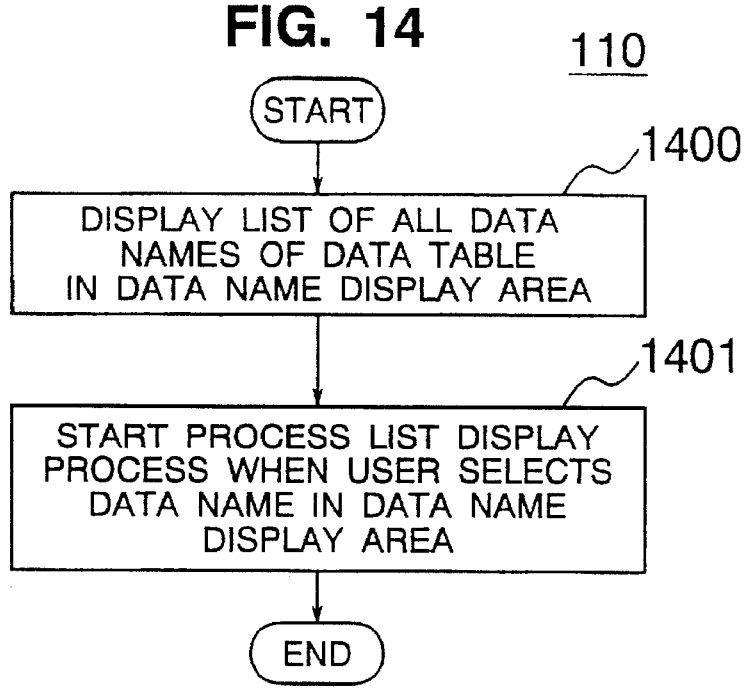

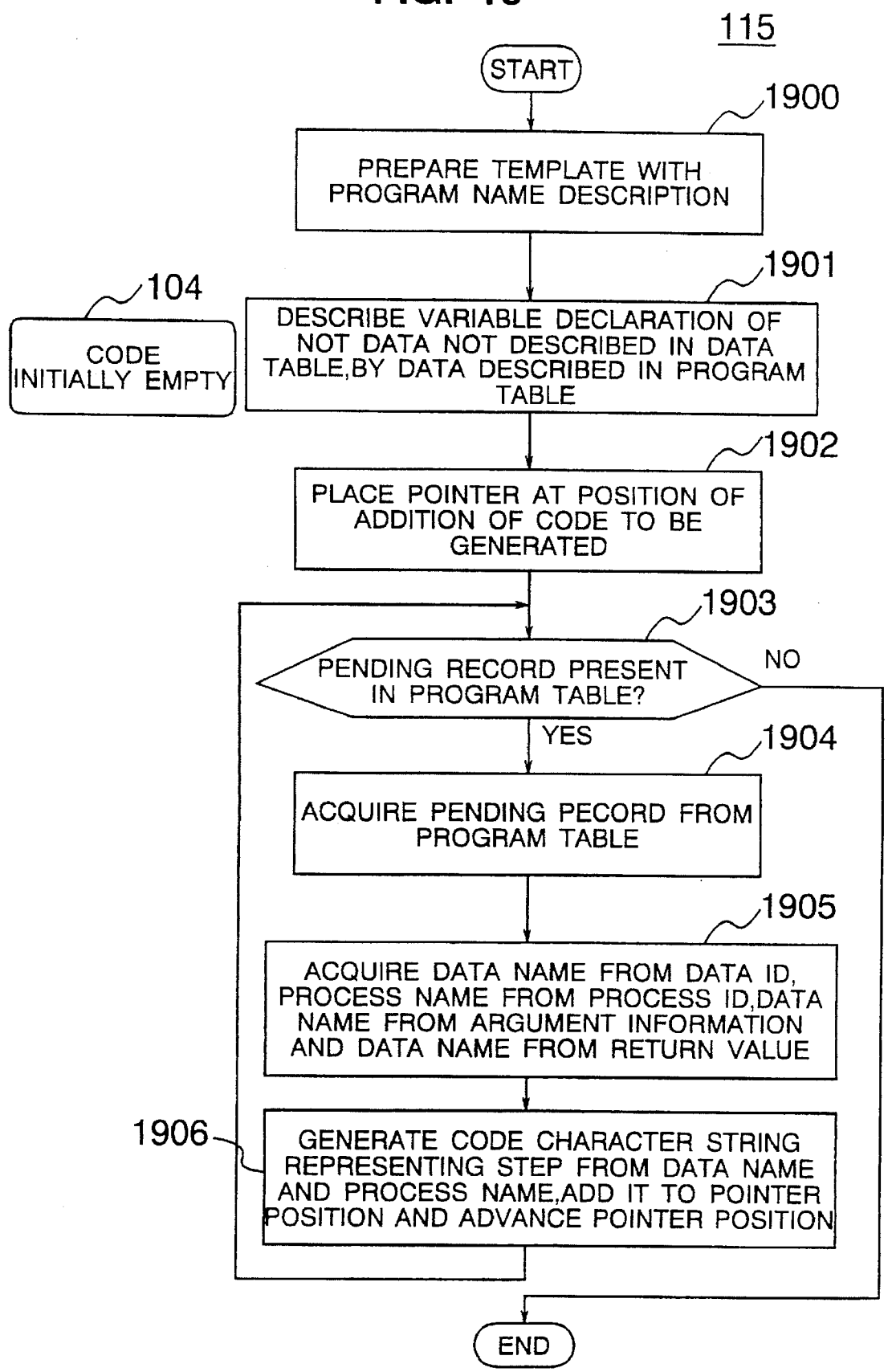

VISUAL PROGRAMMING METHOD

BACKGROUND OF THE INVENTION

The present invention relates to a method for generating a computer program, and more particularly to a method for graphically representing a program to generate a programming language therefrom.

Many approaches to improve the productivity of program in a computer system have been attempted. Of those, an attempt to graphically represent a programming language to reduce a load of coding work by keyboard input (visual programming method) is an effective method. Many approaches have been proposed to graphically represent the programming language. Of those, an approach to define a combination of data and a process for processing it as a node, represent processed data by a port attached to the node and represent delivery of data by a line between ports has been studied widely because of its high representation ability and products therefor have been marketed.

Of those, Prograph marketed by Visual Programming Inc. described in "Using a Pictorial Representation to Combine Dataflow and Object-Orientation in a Language Independent programming Mechanism" (Proceedings International Computer Science Conference, p. 697–704, 1988) displays a process as a node. Data which is subject of process and a port representing argument data are provided at top and bottom of the node. The upper port represents input data and lower port represent data modified by the process. This graphic representation is suitable for a data flow type computation model in which data is sequentially modified in the process. Thus, prograph is provided with a library and a dedicated language to allow description of a general purpose program in a data flow form.

The graphically represented program based on the data flow type computation model is suitable for the description of control of a measuring instrument but it has the following problems. Namely, an infinite repetition such as that an output from one process is used as an input to another process and an output of the second process is used as an input to a subsequent process and so on must be inhibited. Further, in changing an execution order of the processes, the data reliance must be checked. Those problems mean that an edit work to modify the content of the program is difficult.

In a broad sense, the present invention intends to visually generate a program by using a graphic representation. However, the graphically represented program according to the present invention is not based on the data flow type computation model but based on procedural type computation model. This program may be described in most programming languages and is most widely used. Many computer hardware are most suited to the process of this computation model.

SUMMARY OF THE INVENTION

It is a first object of the present invention to provide graphic representation representing a program based on the procedural type computation model and an input method for the graphic representation. In the graphic representation of the present invention, a process flow and data delivery may be described.

In generating a program, means for editing the inputted graphic representation is required. Since the object to which the present invention may be applied is the procedural type computation model, it is required that the description may be made independently form the data reliance. Accordingly, it is a second object of the present invention to provide a method for editing the graphically represented program.

It is a third object of the present invention to generate description by a text type programming language usually used by programmers from the graphic representation. The programmers may then add those portions which cannot be described by the graphic representation by using the generated program.

In order to achieve the present invention, a control program for supporting programming is provided in a main memory. The control program supports the generation of a program by a user. Means provided in the control program to solve the problems described above are explained below.

In the control program of the present invention, a display screen of a display device is divided into three areas. The respective areas are referred to as a data name display area, a process name display area and a program edit area.

In the present invention, the control is conducted based on the following three tables. A data table for managing a data record including a data identifier for identifying data to be used in a user program, a data type and a data name is previously prepared. A process for managing a process information record including a process identifier, a data type, a process name applicable to the data type, a process argument type and a return value type is previously prepared. Further, a program table for managing step information describing data, a process applied thereto, argument data and return value data, which is a step of a program to be generated, is prepared and a blank is stored as an initial value.

In the present invention, a program is generated in the following procedure by using the above tables.

After the programming is started by designating a program name, a list of all data names described in the data table is displayed in the data name display area. The data names are selectable. (step (1))

A record is acquired based on the selected data name and the data type is acquired from the data record. Records in the process management table, which include that data type are acquired. The acquired records are process records which are applicable to the selected data type. The names of the process records are acquired and displayed in the process name display area. The process names are selectable. (step (2))

When the process name is selected, the data and the process have been selected and step information representing one step in a user program is prepared based on the selected data and process. Of the step information, an argument and a return value are handles as new data in the present invention. The step information is graphically represented together with the data name, the process name and the argument. The graphic representation is added to the program edit area. The step information is also added to the program table. In the graphic representation, an area for displaying the data, the argument and the return value is provided by an option by the user. (step (3))

Of the data, the argument and the return value, those which are shared in the user program are designated. The designation is made by selecting the data representation in the graphic representation. Those designated for sharing are displayed by a link line. (step (4))

The steps (1) to (4) are repeated until the completion of the generation of the user program so that the graphic representations and the description of the programs in the program table are added.

At the completion of the user program, the step information is taken out of the program table one at a time and a code representing a program to sequentially execute them is generated. (step (5))

By executing the steps (1) to (4), the graphic representation representing the user program may be entered. The graphic representation of the step comprises the data and the process applied thereto and the argument data and the return value data may be distinguishably displayed. The data sharing between steps is represented by the link line. The graphic representation including the link lines is equivalent to the information in the program table. In accordance with the present invention, the graphic representation representing the program is provided and the means to enter the graphic representation is provided to achieve the first object.

The addition and deletion of the step information and the change of the data sharing may be attained by adding or deleting the step information record from the program table. It is not necessary to examine the data reliance during the edition as it is required in the data flow type computation. In this manner, the second object is achieved by the edit function.

Finally, a program which is equivalent to the graphic representation may be generated by generating the code by a conventional programming language from the step information in the program table. Thus, the third object is achieved.

BRIEF DESCRIPTION OF THE DRAWINGS

FIG. 5 shows a data table, FIG. 6 shows a process management table, FIGS. 7A and 7B show an example (1) of the execution of programming, FIGS. 8A and 8B show an example (2) of the execution of programming, FIG. 13 shows a record generated by the FIG. 14 shows an algorithm of a data display process, FIG. 15 shows an algorithm of a process list display process, FIG. 19 shows an algorithm of a code generation process.

DESCRIPTION OF THE PREFERRED EMBODIMENTS

A first embodiment of the present invention is now explained with reference to the accompanying drawings.

Figure 2:
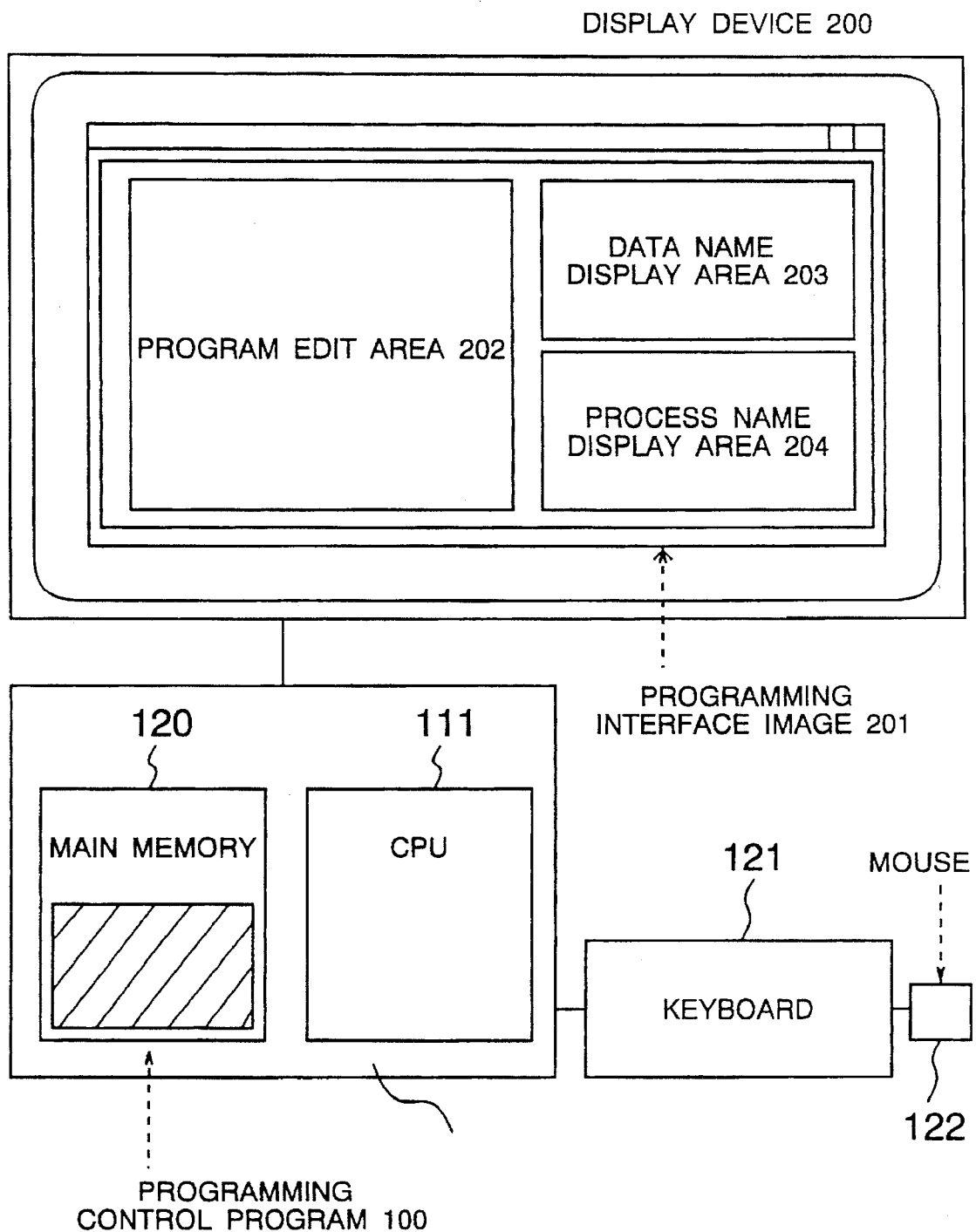
FIG. 2 shows a system configuration including hardware.

FIG. 2 shows a system configuration including hardware to be used in the present embodiment. As hardware resources, a display device 200, a main memory 120, a CPU 211, a mouse 121 and a keyboard 122 are used. The present invention is implemented by a programming control program stored in the main memory 120. The program 100 controls the hardware resources to implement the program generation method of the present invention. The program 100 displays a programming interface image 201 in the display device 200. The image includes a program edit area 202, a data name display area 203 and a process name display area 204, and a user program is generated by a user operation in the image.

Figure 1:
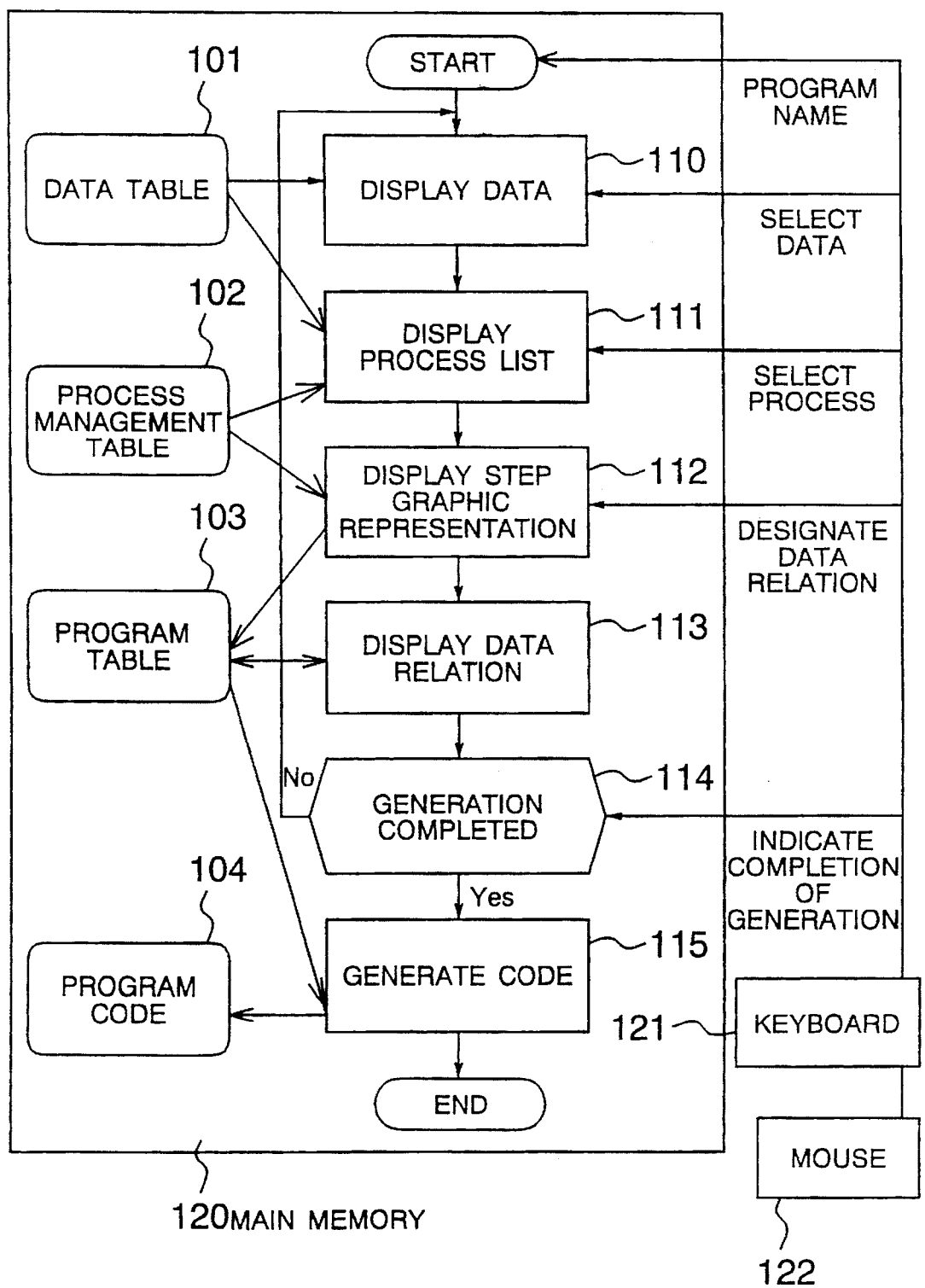
FIG. 1 shows a programming control program which as a feature of the present invention.

FIG. 1 shows a content of the programming control program 100.

A data structure required in the program generation method of the present invention includes a data table 101, a process management table 102 and a program table 103. Each step of the program shown on the right hand of FIG. 1 is executed by the designation by a user while using those data to finally generate a code 104 of the program.

An operation of the programming control program is explained in a specific example in accordance with a procedure in which the user actually generates the program. FIGS. 7A to 12B illustrate actual screen operations by the user to generate the program code 104. FIG. 13 shows the generated code. FIGS. 14 to 19 show details of the processes shown in FIG. 1.

Figures 3, 4:
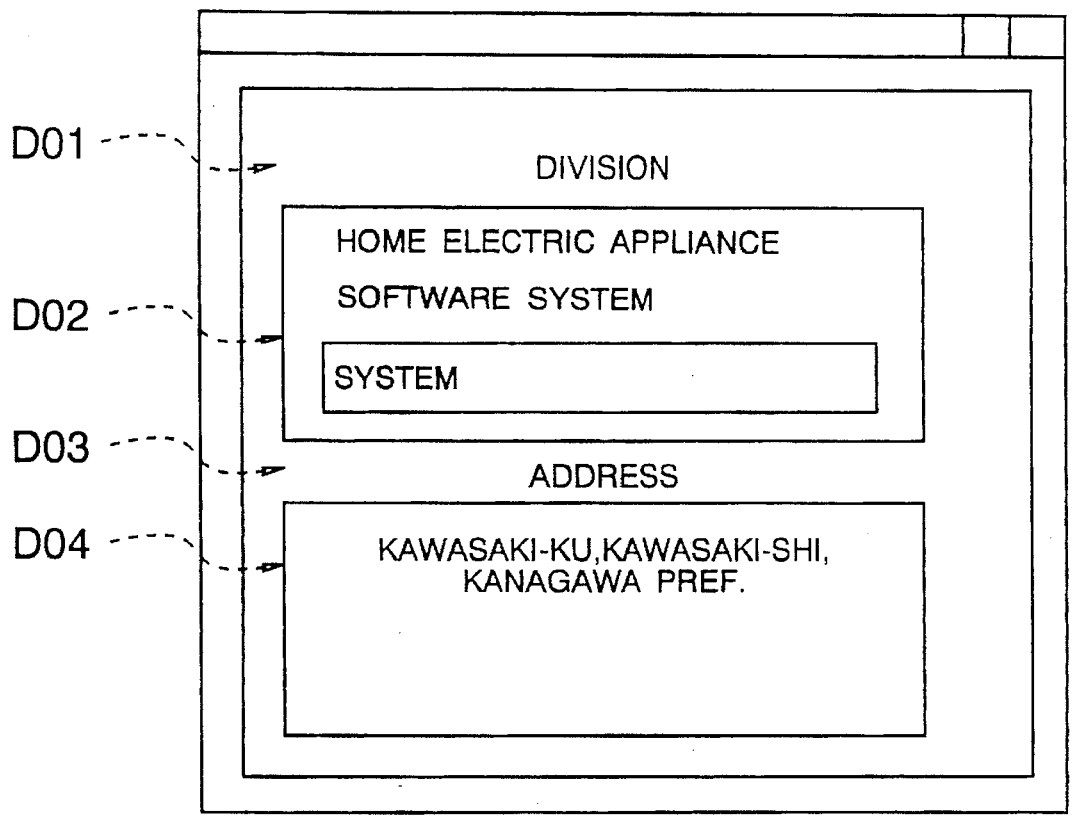
FIG. 3 shows an interface image to be described in an embodiment.
FIG. 4 shows a database to be described in the embodiment.

In the present embodiment, the program to be generated describes a behavior of the previously prepared user interface image. The user interface image is shown in FIG. 3. A list area D02 for displaying a list of a division of an enterprise is provided in the image. A text area D04 is included at the bottom of the image of FIG. 3. Two labels D01 and D02 are provided for display. D02 and D04 are identifiers which uniquely represent the image or the label in the system. In the present embodiment, a behavior when the user selects one item in the list D02 is programmed. The location of the division selected from the list D02 is displayed in the text area D04 by the selection by the mouse. In the program, an enterprise database (enterpriseDB) shown in FIG. 4 having information on address and telephone number of the particular division is accessed. An identifier of the database is D05. The database has three records (home electric appliance, software and system) and each record includes a division field 401 representing a division name, an address field representing an address and a tel No. filed representing a telephone number. The program designates a division name character string and a character string "ADDRESS" or "Tel No" to the database to acquire necessary information.

As shown in FIG. 1, prior to the programming, the contents of the data table 101 and the process management table 102 are previously set therein. Namely, the content of the data table 101 is defined when the image shown in FIG. 3 is constructed and the content of the process management table 102 is defined when the program corresponding to the processes to be registered in the table 102 is prepared.

FIG. 5 shows a content of the data table 101 in the present embodiment. The data table 101 is a table for managing a record having a data ID field 500 which is an identifier, a data type field 501 and a data name field 503. In FIG. 4, a record representing the five data (D01 to D05) shown in FIGS. 3 and 4 is stored. For example, the data ID indicates that the record D02 has List as the data type and listPart as the data name.

FIG. 6 shows a content of the process management table 102 in the present embodiment. The table 102 is a table for managing a record having a process ID field 600, a data type field 601, a process name field 602, a first argument data type field 603, a second argument data type field 604 and a return value data type field 605. The process ID 600 is an identifier which uniquely represents a record. Each record represents a specification of a process applicable to the described data type. The process specification comprises a process name, up to two argument types and a return value. For example, for the database (DB) retrieval process Search, the process ID is S03 which indicates that the process is applicable to the DB type data. Two arguments are required each having a character string type (String type) and the return value is also character string type.

A program table 103 shown in FIG. 7B is empty when the programming is started. The table 103 is a table for managing a record having a data ID field 710 to be processed, a process ID field 711 for identifying a record in the process management table, a first argument data ID field 712, a second argument data ID field 713 and a return value data ID field 713. Each record represents individual steps of the program to be generated.

A source code to be generated is also initially empty and code character strings are added thereto by the program in the procedure to be described later.

FIG. 7A shows an example of image at the start of the programming. The programming is started when the user selects, by a mouse, a button indicated by "start" shown by ① in FIG. 7A. At the start, the system inquires to the user about the program name and the user responds thereto so that the program name is displayed in the area shown by ②. In the present embodiment, the program name is "OnList-Select". When the program selects a desired program name from the list of the program names displayed by the control program of the present invention, the selected program name may be displayed in the area ②. Since the present invention does not directly relates to the designation of the program name, the procedure therefor is not described herein. When the program name is designated, the indication of the button selected in ① of FIG. 7A is changed to "end". The button is used again to subsequently designate the description of the program generation.

When the programming is started, the data display process 110 of FIG. 1 is executed. FIG. 7A shows a programming interface image 201 after the execution of the process 110. The image comprises the program edit area 202, the data name display area 203 and the process name display are 204, as shown in FIG. 2. The program edit area 202 comprises a program graphic representation display area 700 and a local data display area 701.

A content of the "OnListSelect" program is as follows. A character string (division name) is selected from the listPart (step 1), the address of the selected division is acquired form the enterpriseDB (step 2), and the acquired address is displayed in the infoPart (step 3). The program code to be generated (described in the C++ language) is shown as a part 1303 in FIG. 13. The code shown in FIG. 13 is actually generated by the system in the following procedure.

Detail of the data display process 110 is shown in FIG. 14. First, all data names in the data table 101 is displayed in a list in the data name display area 203 (step 1400). In the present embodiment, display as shown in the data display area 203 of FIG. 7A is finally made. When the user selects a data name form the list, the process list display process 111 is started in response to the selection (step 1401).

A content of the program table 103 at this point is shown in FIG. 7B. As described above, the initial value of the table is empty and no addition has been made.

When the data name is selected by the mouse, the process list display process 111 is started. A selection process is shown by ① in FIG. 8A. By executing the process list display process 111, a list of the process names applicable to the selected data (listPart) is displayed as shown by ② in FIG. 8A. Detail of the process 111 is shown in FIG. 15.

First, process records having the data type (List type) selected by the user are acquired from the process management table 102 (step 1500). In the present embodiment, the record having the List type data is only S01 as shown in FIG. 6. The process names 602 in the process records are then displayed in the process name list display area (1501). In the present embodiment, GetSelectedString is displayed and, as a result, display as shown in the process name display area 204 of FIG. 8A is made. When the user selects a process name from the list, the step graphic representation display process 112 is started in response to the selection (step 1502).

Figure 16:
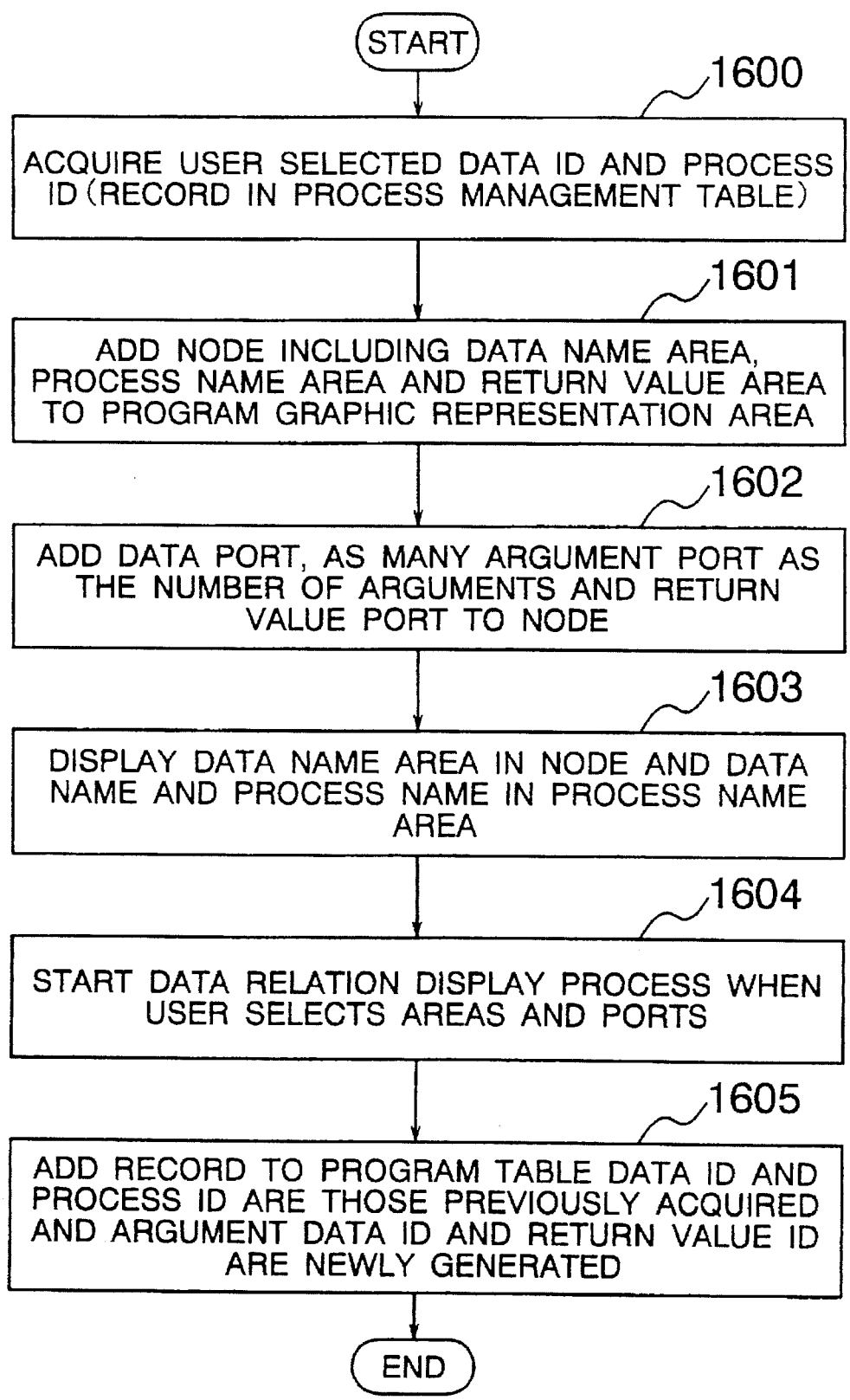
FIG. 16 shows an algorithm of a step graphic representation display process.

When the process name is selected by the mouse, the step graphic representation display process 112 is started. A selection process is shown by ② in FIG. 8A. By the step graphic representation display process 112, a step for applying the selected process (GetSelectedString) is added to the selected data (listPart). Detail of the process 112 is shown in FIG. 16.

First, the data ID selected by the user and the process ID are acquired (step 1600). Those ID's have been selected in ① and ② in FIG. 8A and the identifiers thereof are D02 and S01.

Then, a node graphic representation (800) having a data name area 801, a process name area 802 and a return value area 803 is added to the program graphic representation display area 700 (step 1601). A data port 804, an argument port 805 and a return value port 806 are added to the node graphic representation. The number of argument ports is described in the corresponding record in the process management table 102. In the present embodiment, the argument is only one which is of the String type. The node graphic representation 800 is displayed by using a previously prepared template.

Then, the data name (listPart) 503 is displayed in the data name area 801 and the process name (GetSelectedString) 602 is displayed in the process name area 802 (step 1603). As a result, the display of the program graphic representation display area 700 as shown in FIG. 8A is made. When the user selects the area and the port in the node graphic representation, the data relation display process 113 is started in response to the selection (step 1604).

As shown in FIG. 8B, a new record 810 is then added to the program table 103. The data ID 710 and the process ID 711 of the record have previously been acquired and they are D02 and S01, respectively. A data ID of the argument 1 (712) is newly prepared as D06. A data ID of the return value 714 is also newly prepared as D07. Since it is described in the process management table 102 that the data of the argument 1 and the return value are String type, this data type is set (step 1605). In the above example, the application of the GetSelectedString process to the listPart data is entered although the data delivery is not designated because a plurality of processes are needed for the data delivery.

Accordingly, in the above description, one more step is described in the program graphic representation display area 700 prior to the movement to the data relation display process 113. Namely, the process returns to the data display process 110 in order to continue the description of the program without moving to the data relation display process 113.

Figures 9A, 9B:
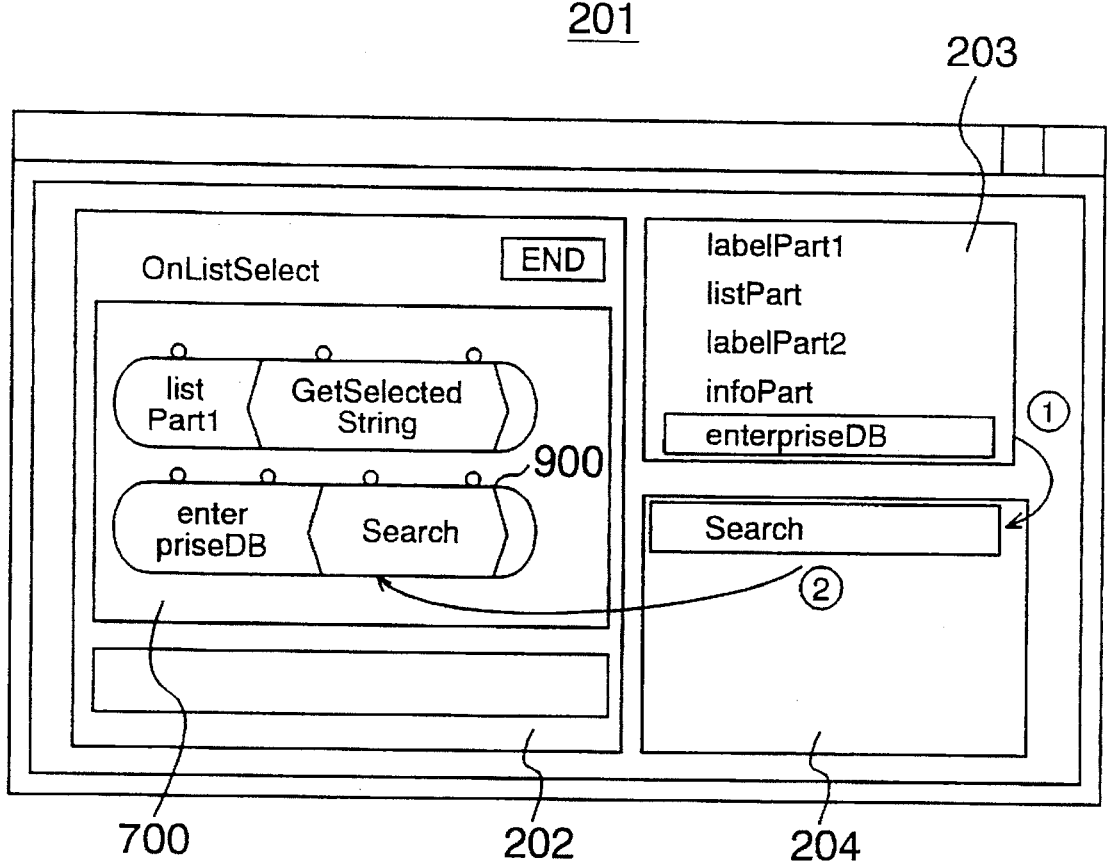
FIGS. 9A and 9B show an example (3) of the execution of programming.
Figures 10A, 10B:
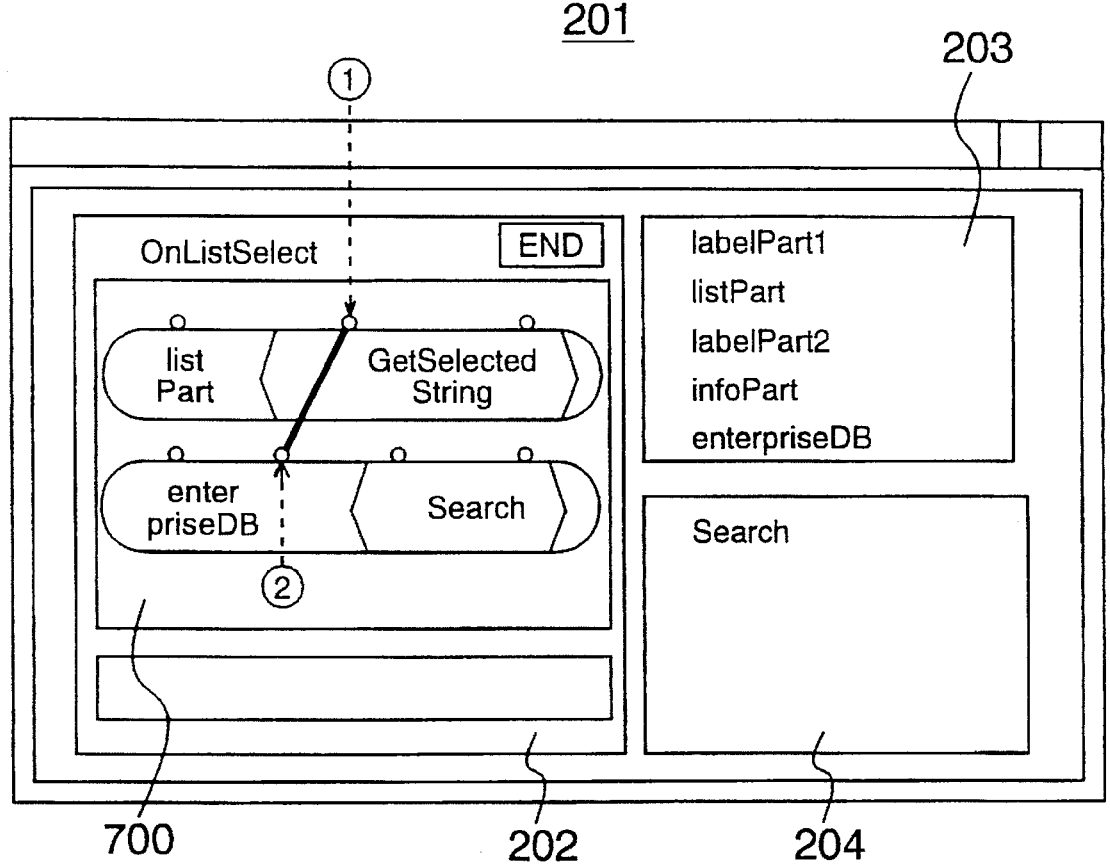
FIGS. 10A and 10B show an example (4) of the execution of programming.
Figure 17:
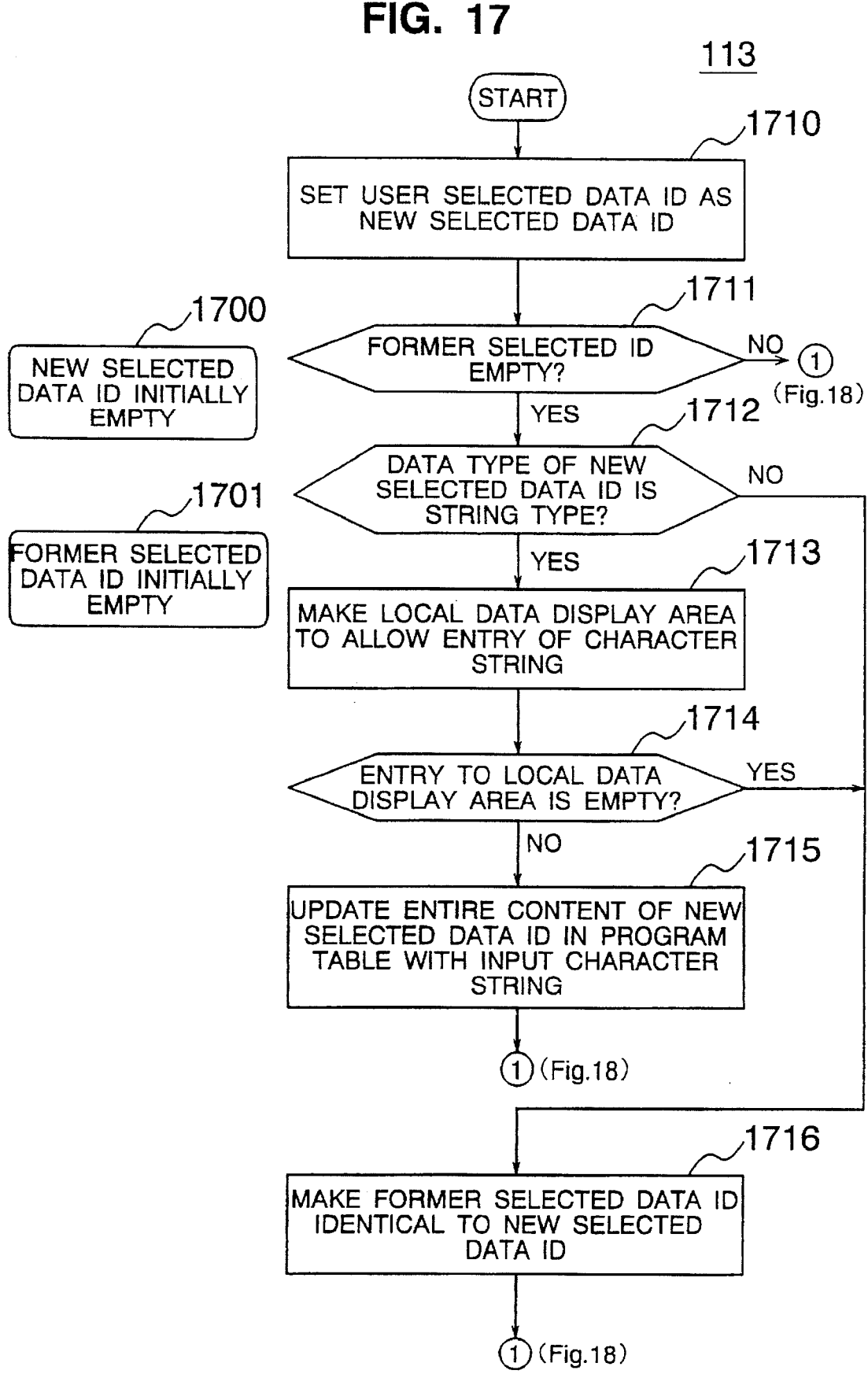
FIG. 17 shows an algorithm of a data relation display process.

A second step is an address retrieval process for the enterpriseDB data. Since the process uses the division character string previously acquired from the listPart as the argument, the designation Of the data relation is required. The history of description so far is shown in FIGS. 9A and 9B. In FIG. 9A, the data name indicated by ① is selected by the mouse and a desired process ② is selected from the process list (Search) displayed in response to the selected data. In this manner, a node graphic representation 900 of the process of the enterpriseDB is added to the program graphic representation display area 700 as it is in the previous example. A new record 910 is added to the program table 103. In the above procedure, the data display process 110, the process list display process 111 and the step graphic representation display process 112 have been executed. Then, the data relation display process 113 is executed based on the user operation for designating the data delivery of the first step and the second step. FIGS. 10A and 10B show a user operation for designating the data relation. In FIG. 10A, an argument port indicated by ① is selected by the mouse, and an argument port indicated by ② is selected by the mouse. The data relation display process 113 is activated by the above operations. Detail of the process 113 is shown in FIG. 17. In the process 113, in order to indicate that the first selected data and the next selected data are identical, a link line is displayed between ports. The association between the port and the data name necessary for the link line operation between ports by the user is displayed on the image based on the user request.

Referring to FIG. 17, the data relation display process 113 corresponding to the selection operation of ① of FIG. 10A is explained. In the process 113, two data, one being new selected data ID 1700 selected by the user and the other being former selected data ID 1701 previously selected are locally used, that is, only for the process 113. Both data are initially empty.

First, the user selected data ID is set as the new selected data ID (step 1710). In the present embodiment, the argument port indicated by ① in FIG. 10A has the data ID of D06 so that the new selected data ID is D06.

At this point, the former selected data remains empty as it was initially set (decision 1711), and the new selected data ID has the data type of String type (decision 1712). Accordingly, the local data display area 701 is rendered to allow the entry of the character string data (step 1713). The local data display area 701 allows the direct entry of the character string from the keyboard. Whether to enter the character string or not depends on the user selection. In the present embodiment, since the data representing the division is acquired from the listPart, the direct entry of the character string is not conducted and the display area 701 is left empty. As a result, since it is determined to be empty in the next decision step (decision 1714), the former selected data ID is set to D06 which is identical to the new selected data ID (step 1716). So far, the data relation process 113 for the selection of the argument port indicated by ① by the mouse has been described. In the above process, no change occurs in the display.

Figure 18:
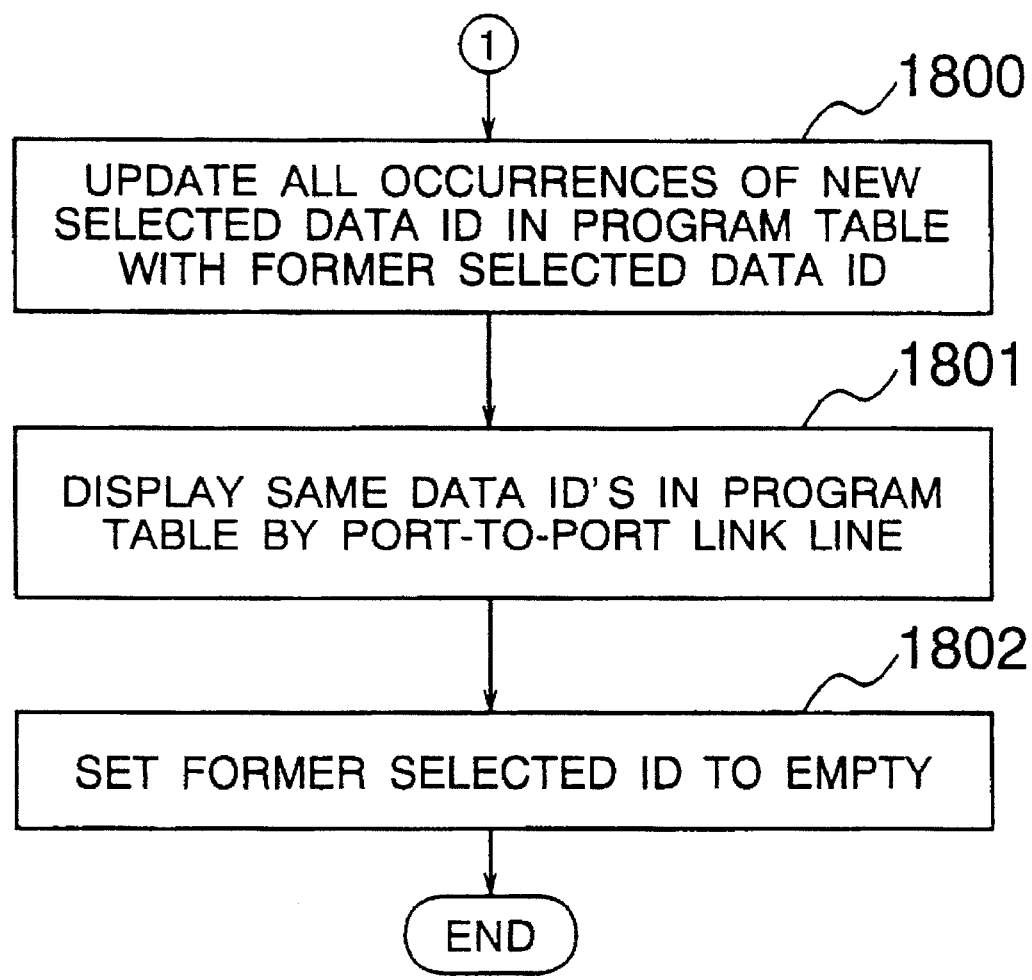
FIG. 18 shows an algorithm (continued) of the data relation display algorithm.

Referring to FIGS. 17 and 18, the data relation display process 113 by the selection operation of ② of FIG. 10A is explained. In the above process, the former selected data ID is D06.

The new selected data ID is D08 which is the data ID of the argument port indicated by ② of FIG. 10A. (Reference is made to the first argument 712 of the second record 910 included in the program table 103 of FIG. 9B.) Since the former selected data ID is now not empty(decision 1711), the entire content of the new selected data ID (D08) in the program table is updated by the former selected data ID (D06) (step 1715). As a result, the content of the program table 103 is updated as shown by a box 1010 in FIG. 10B (step 1800).

Then, the ports representing the same data ID are linked as shown in FIG. 10B (step 1801). The former selected data is reset to the empty state (step 1802).

Following to the designation of the first argument in the second step, the second argument is also designated.

Figures 11A, 11B:
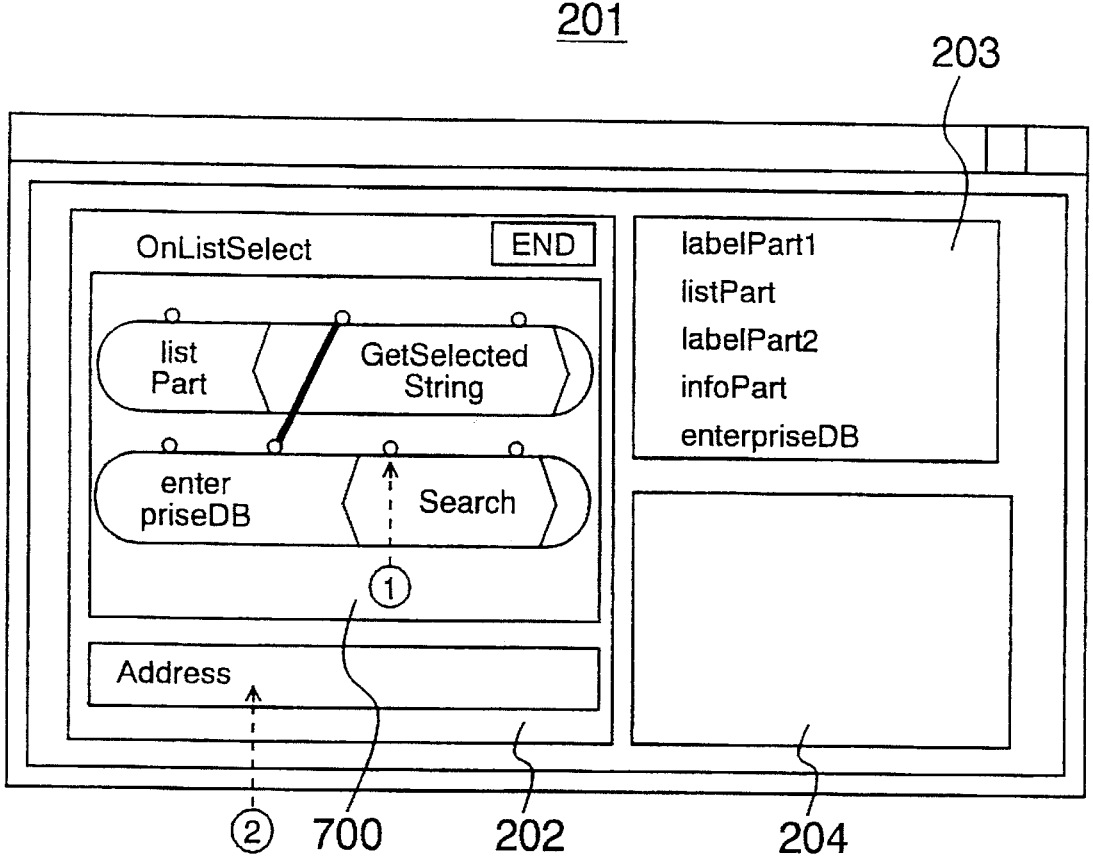
FIGS. 11A and 11B show an example (5) of the execution of programming.

A character string is directly entered to the second argument of the Search process for the enterpriseDB. A user operation therefor is shown in FIGS. 11A and 11B. When the user selects the argument port indicated by ① of FIG. 11A, the data relation display process 113 is started. The new selected data ID is set to D09 which is the data ID representing the designated port (step 1710). Since the former selected data ID is empty (decision 1711) and the data type of the new selected data ID is the String type (decision 1712), the local data display area is rendered to allow the entry of the character string data (decision 1713).

Since the data is directly entered in this case, the user directly enters "Address" to the local data display area 701 from the keyboard. As a result, since the entry to the local data display area is not empty (decision 1714), the content of the new selected data (D09) in the program table 103 is updated by the input character string as shown by a box 110 of FIG. 11B (step 1716).

Figure 12A:
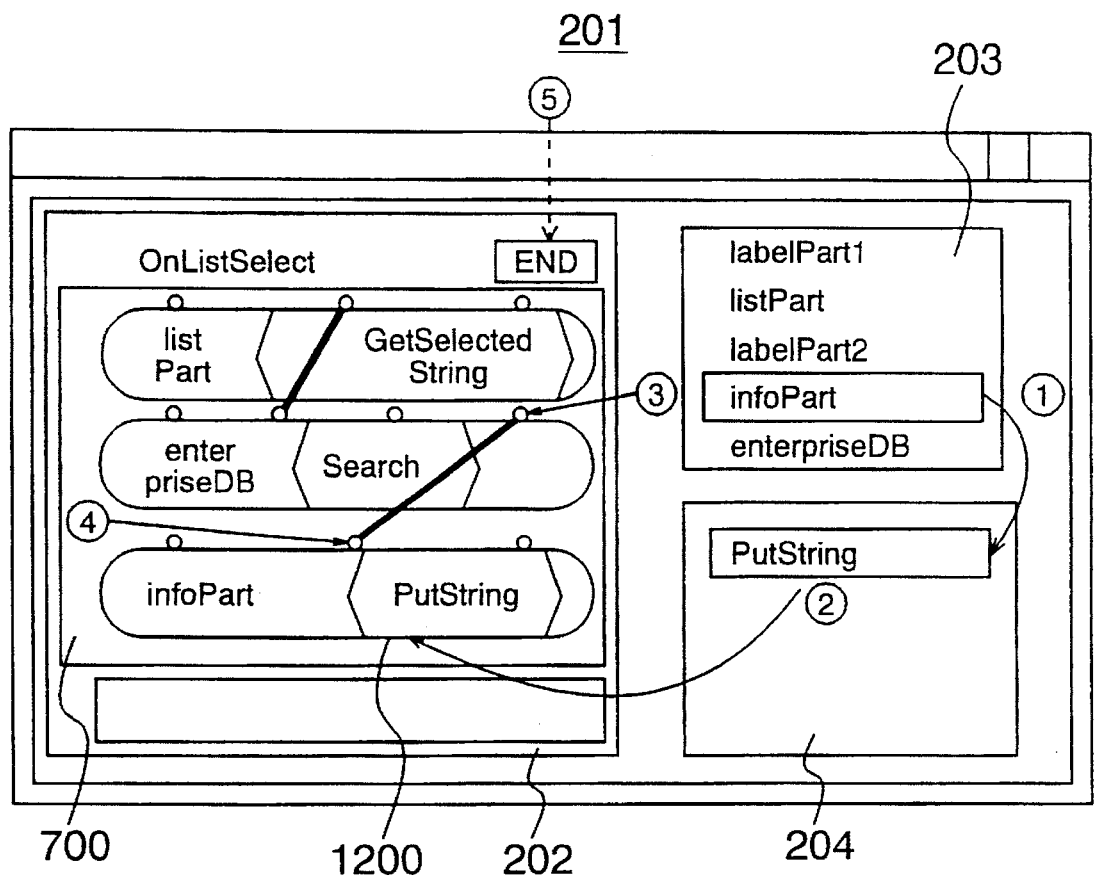
FIGS. 12A and 12B show an example (6) of the execution of programming.
Figure 12B:
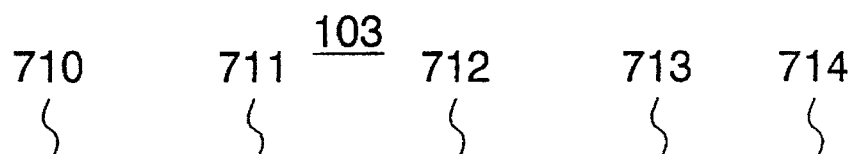

A third step is the character string output process for the infoPart. A user operation for this process is shown in FIGS. 12A and 12B. One of the data names displayed in the data display process 110 is selected ①, and one of the process names displayed in the process list display process is selected and the node graphic representation 1200 is added to the program graphic representation display area 700 ②. Since the character string displayed in the character string output process is the result of retrieval of the database in the second process, the character string is designated as the first argument of the character string output process. To this end, the Search return value port indicated by ③ of FIG. 12A is selected and then the argument port indicated by ④ of FIG. 12A is selected. As a result, the data relation display process 113 links the selected return value port to the argument port.

The record shown by a box 1210 of FIG. 12B is added to the program table 103. So far, the description of the "OnListSelect" program has been completed. In order to indicate the completion of the description of the program, the user selects the button indicated "end" shown by Gin FIG. 12A by the mouse. Thus, the completion of the description is noticed to the system (decision 114 in FIG. 1) and the code generation process 115 is started. The selected "end" button is changed to "start" after the start of the process 115. In this manner, the programming may be started again after the completion of the code generation process.

The code generation process is shown in FIG. 13. The program code is generated in the sequence of (1), (2) and (3) of FIG. 13. Detail of the code generation process 115 is explained with reference to FIG. 19. A language used in the generation is the C++ language.

The data used in the code generation process 115 is the generated code 104. The initial value of the code 104 is empty.

First, a template code describing the program name as shown by 1300 in FIG. 13 is prepared (step 1900) so that a minimum required program is formatted.

Then, variable declaration of the data described in the program table 103 and not described in the data table 101 is described as shown by a part 1301 in FIG. 13 (step 1901). In the present embodiment, since the data described in the data table 101 is uniquely identified in the system, it may be referred as an external variable. The data name is identical to the name described in the data table 101. The data not described in the data table 101 is used in the individual steps as the local data. In the step 1901, the local data is generated. The data not described in the final program table 103 shown in FIG. 12B are D06, D07, D10 and D11. The data typeset those are described in the process management table 102. Namely, by referring the process ID 600, it is seen that the String type data are D06 and D11 and the Boolean type data are D07 and D10.

The description of the main part of the program is now explained. The three records described in the program table 103 of FIG. 12B corresponds to the three steps.

First, a pointer is placed at a point of addition of the code to be generated (step 1902). Namely, the point of addition of the code is pointed by the mouse. In the present embodiment, the pointer is placed after the variable declaration shown by 1301 in FIG. 13.

Since three pending records are included in the program table (decision 1903), the pending records are acquired (step 1904). First, the record #1 of the program table 103 of FIG. 12B is taken out.

The data name is acquired from the data ID (listPart from D02), the process name is acquired from the process ID (GetSelectedString from S01) and the first argument ID is set as the data name (step 1905).

A code character string representing the step is prepared based on the data name and the process name. For the C++language, the return value data is placed first, and the data (object instance), the process name and the argument are sequentially arranged and the spaces therebetween are connected by punctuation characters having particular significance. The character string corresponding to the record #1 is generated as shown in the first line of the part 130 of FIG. 13. This character string is inserted to the position in the code pointed by the pointer and the pointer position is changed to the next line (step 1906).

The steps 1904 to 1906 are repeated until the pending record is no longer present in the program table 103 (decision 1903) and the generated code is shown in a part 1303 of FIG. 13. The finally generated code is shown by (3) in FIG. 13.

During the execution of the program, the previously generated process program such as the listPart included in (3) of FIG. 13, rather than the generated program is executed.

In the present embodiment, since only the data having the String type argument is handled, the designation of the sharing of different data types is not intended. However, it is normally impossible from the sense of program to share the data of the integer type and the character string type. In this sense, the above restriction may be solved by checking whether the sharing of two data is permitted or not when the sharing of data is designated, and if not allowed, inhibiting the sharing. By adding the above step to the step 1800 of the data relation display process 113 shown in FIG. 18, the above restriction may be solved. When the indication of the identical data is not made in the data relation display process 113, the system generates the input data when it generates the program code.

In another embodiment of the present invention, the system newly generates the argument data to indicate to the user the data not designated for the sharing by the user. Thus the user can recognize the nondesignated data and proceed the designation of the data sharing based on the recognition result. In order to achieve the above operation, the display state of the newly generated argument port may be changed in the step graphic representation display process 112.

The present invention is also applicable when the data which is the subject of the programming is displayed in the user interface image. The data having the integer type or the character string type is usually not visible by the user. However, the interface image is provided in essentially visible form, and the display image of the data display process of the present invention is one of them. In actual, for an event corresponding to an element on the interface image selected by the mouse, a process to display a list of processes applicable to the event may be registered.

In accordance with the present invention, the program is generated by the graphic representation which is more comprehensive than the description by the text language. The program of the text language is generated from the graphically represented program so that the generated program may be combined with other program of the text base program.

The input operation of the individual steps of the program may be implemented by the data displayed on the interface image or the selection of the process. As a result, the burden of the user in exactly memorizing the keyboard type, the data name and the process name is reduced.

By representing the individual steps by the node graphic representation of the present invention, the data, the process and the argument can be clearly distinguished. The data and the argument used in the steps may be used in other steps. In accordance with the present invention which is applied to the procedural type computation model, the individual steps are independent from other steps as opposed to the data flow type computation model so that the check for the data reliance is not necessary and the edition of the graphic representation is ready.

Further, in accordance with the present invention, since the system determines the name of the data generated based on the graphically represented program generated by the user on the image and the indent for coding, the representation of the code representing the program may be standardized.

We claim:

1. A visual programming method using a processing apparatus having a display device and an input device connected thereto and including a memory, comprising the steps of:
    a) selecting by using said input device one of data from a list of data to be used for programming, displayed in a first display area of said display device;
    b) selecting by said input device, one of processes from a list of processes applicable to the data type of the selected data, displayed in a second display area of said display device;
    c) displaying a step graphic representation graphically representing input/output data including a name of the selected data, a name of the selected process and an argument and a return value for the selected process, in a third display area of said display device;
    d) repeating said steps a) to c) in response to indication from said input device;

e) selecting the input/output data of the step graphic representations displayed in the third display area of said display device based on the indication from said input device, displaying a display for associating the corresponding input/output data in the third display area, and updating the names of the corresponding input/output data to identical names; and f) generating a program code corresponding to the step graphic representation generated on the third display area of said display device by said steps a) to e).

2. A visual programming method according to claim 1, wherein the step graphic representation in said step c) is a node graphic representation including a data name area, a process name area and a return value area and at least one port is provide at the top of said node to represent as many data and return value data as the number of arguments.

3. A visual programming method according to claim 1, wherein said step e) displays a link line connecting the corresponding input/output data in the third display area.

4. A visual programming method according to claim 1, wherein said step e) restricts the corresponding input/output data selectable by the indication from said input device to the same data type.

5. A visual programming method according to claim 1, wherein said step e) inputs the data name of at least one of the corresponding input/output data from said input device by the indication of a user.

6. A visual programming method according to claim 1, wherein said step f) adds the input data corresponding to the argument or the return value to the program code to be generated when the association to the data input/output is not designated in the argument or the return value.

7. A visual programming method according to claim 1, wherein said step e) displays a display representing non-designation in the third display area when the association to the data input/output is not designated in the argument or the return value.

* * * * *